United States Patent
Lee et al.

(10) Patent No.: US 10,268,882 B2
(45) Date of Patent: Apr. 23, 2019

(54) APPARATUS FOR RECOGNIZING POSTURE BASED ON DISTRIBUTED FUSION FILTER AND METHOD FOR USING THE SAME

(71) Applicant: ELECTRONICS AND TELECOMMUNICATIONS RESEARCH INSTITUTE, Daejeon (KR)

(72) Inventors: Soyeon Lee, Daejeon (KR); Jae Hyun Lim, Seongnam-si (KR); Sangjoon Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/657,349

(22) Filed: Jul. 24, 2017

(65) Prior Publication Data

US 2018/0032802 A1  Feb. 1, 2018

(30) Foreign Application Priority Data

Jul. 28, 2016  (KR) .................. 10-2016-0096290

(51) Int. Cl.
*G06K 9/00* (2006.01)
*G01C 23/00* (2006.01)
(Continued)

(52) U.S. Cl.
CPC ......... *G06K 9/00362* (2013.01); *G01C 23/00* (2013.01); *G06K 9/00342* (2013.01);
(Continued)

(58) Field of Classification Search
CPC .......... G06K 9/00342; G06K 9/00362; G06K 9/6288; G06K 9/629; G06K 9/6293;
(Continued)

(56) References Cited

U.S. PATENT DOCUMENTS

| | | | | |
|---|---|---|---|---|
| 2008/0158224 | A1* | 7/2008 | Wong | G06T 13/40 345/419 |
| 2013/0116823 | A1* | 5/2013 | Ahn | G05D 1/027 700/258 |

(Continued)

FOREIGN PATENT DOCUMENTS

| | | | | |
|---|---|---|---|---|
| KR | 20110064712 | * | 6/2011 | G06F 3/011 |
| KR | 10-1080078 | | 11/2011 | |

OTHER PUBLICATIONS

Soyeon Lee et al., "Kinematic Skeleton Based Control of a Virtual Simulator for Military Training", Symmetry 2015, 7, Jun. 11, 2015, pp. 1043-1060.

*Primary Examiner* — Amara Abdi
(74) *Attorney, Agent, or Firm* — Kile Park Reed & Houtteman PLLC

(57) ABSTRACT

Disclosed herein are an apparatus and method for recognizing a posture based on a distributed fusion filter. The apparatus for recognizing a posture based on a distributed fusion filter includes a calculation unit for generating first position information about a joint of a user by receiving measurement signals from multiple inertial sensors placed on a body of the user, a recognition unit for generating second position information using output information acquired in such a way that a vision sensor captures an image of the user, and a fusion unit for fusing the first position information with the second position information and generating final position information about the joint of the user using the fused information.

20 Claims, 8 Drawing Sheets

(51) Int. Cl.
 *G06K 9/62* (2006.01)
 *G06T 7/70* (2017.01)
 *G06K 9/78* (2006.01)

(52) U.S. Cl.
 CPC ........... *G06K 9/629* (2013.01); *G06K 9/6288* (2013.01); *G06K 9/6293* (2013.01); *G06K 9/78* (2013.01); *G06T 7/70* (2017.01); *G06T 2207/30196* (2013.01)

(58) Field of Classification Search
 CPC ... G06K 9/78; G06T 2207/30196; G06T 7/70; G01C 23/00
 See application file for complete search history.

(56) References Cited

U.S. PATENT DOCUMENTS

2015/0139505 A1* 5/2015 Vladimirov ............. G06T 7/246
 382/107
2015/0146928 A1 5/2015 Kim et al.

* cited by examiner

APPARATUS FOR RECOGNIZING POSTURE BASED ON DISTRIBUTED FUSION FILTER AND METHOD FOR USING THE SAME

CROSS REFERENCE TO RELATED APPLICATION

This application claims the benefit of Korean Patent Application No. 10-2016-0096290, filed Jul. 28, 2016, which is hereby incorporated by reference in its entirety into this application.

BACKGROUND OF THE INVENTION

1. Technical Field

The present invention relates generally to an input interface, and more particularly to technology for recognizing the posture of a user.

2. Description of the Related Art

Recently, as virtual reality technology attracts attention in many ways, effort to apply virtual reality technology to various fields is increasing. For example, virtual reality technology may be applied to a military tactical training simulator. The greatest advantage acquired when virtual reality technology is applied to a military tactical training simulator is that military tactical training corresponding to various situations in actual warfare may be conducted without limitation as to time and place. To this end, various techniques are incorporated into virtual reality technology.

When a virtual reality simulator is configured so as to include a function of interaction with users, technology for recognizing the position and posture of a user (or trainee) is most important.

In existing virtual reality technology, there are various techniques for tracking the posture of a moving person in real time. The representative techniques include three methods. The first one is a marker-based posture recognition method configured such that markers are placed on the body of a person and the movement of the person is tracked using multiple optical sensors. The second one is a marker-less posture recognition method, which may use a depth image sensor or an RGB image. The third one is an inertial sensor-based posture recognition method, configured such that inertial sensors are placed on person's respective joints and postures of the respective joints are estimated and then linked through relationships between the joints.

The above-mentioned methods have their own advantages and disadvantages, and the use of only one type of sensor may not meet user requirements depending on the application.

Meanwhile, Korean Patent No. 10-1080078, titled "Motion capture system using integrated sensor system", relates to a method for realizing simple motion capture by adding sensing information to 2D plane information acquired using a single camera, and discloses a method of deriving the final posture information by combining inertial data, acquired by capturing a user, with data into which an acceleration sensor value and an angular velocity sensor value are fused using a Kalman filter.

However, Korean Patent No. 10-1080078 has limitations as to accuracy and usefulness of obtained data because posture information which is derived in such a way does not describe well on the required information regarding on the user's body kinematics.

SUMMARY OF THE INVENTION

An objective of the present invention is to use two or more types of sensors together compensating each other, and to thereby improve accuracy of determining user's postures, realize fast responsiveness, etc., which are required for applications.

Another objective of the present invention is to perform accurate and reliable recognition of postures using the advantages of the existing posture recognition technology and by supplementing the disadvantages thereof.

A further objective of the present invention is to maximize the realism of virtual reality.

Yet another objective of the present invention is to apply posture recognition to various applications, such as military tactical training, rehabilitation training, treatments, sports training, games, entertainment, and the like.

In order to accomplish the above objectives, an apparatus for recognizing a posture based on a distributed fusion filter according to an embodiment of the present invention includes a calculation unit for generating first position information about a joint of a user by receiving measurement signals from multiple inertial sensors placed on a body of the user; a recognition unit for generating second position information about the joint of the user using output information acquired in such a way that a vision sensor captures an image of the user; and a fusion unit for fusing the first position information with the second position information and generating final position information about the joint of the user using the fused information.

Here, the calculation unit may generate the first position information about the joint of the user by connecting the measurement signals with body information of the user by a kinematic relationship.

Here, the fusion unit may be configured to estimate a first state variable matrix and a first error covariance matrix, which is an error covariance matrix of the first state variable matrix, using a first sub-filter based on the first position information, and to estimate a second state variable matrix and a second error covariance matrix, which is an error covariance matrix of the second state variable matrix, using a second sub-filter based on the second position information.

Here, each of the first state variable matrix and the second state variable matrix may be configured such that a first row contains first-axis position information, a second row contains second-axis position information, a third row contains first-axis speed information based on the first-axis position information, and a fourth row contains second-axis speed information based on the second-axis position information.

Here, a magnitude of measurement error covariance of the first sub-filter may be set equal to that of the second sub-filter.

Here, the fusion unit may add a first inverse matrix, which is an inverse matrix of the estimated first error covariance matrix, and a second inverse matrix, which is an inverse matrix of the estimated second error covariance matrix, and may calculate a third error covariance matrix by performing inverse-transformation of a third inverse matrix, which is a sum of the first inverse matrix and the second inverse matrix.

Here, the fusion unit may calculate a third state variable matrix by multiplying the third error covariance matrix by a third fusion matrix, which is a sum of a first fusion matrix and a second fusion matrix, the first fusion matrix being calculated by multiplying the estimated first state variable matrix by the first inverse matrix, and the second fusion matrix being calculated by multiplying the estimated second state variable matrix by the second inverse matrix.

Here, the fusion unit may feed the calculated third state variable matrix and the calculated third error covariance matrix back to the first sub-filter and the second sub-filter.

Here, the first sub-filter and the second sub-filter may estimate the first state variable matrix, the first error covariance matrix, the second state variable matrix, and the second error covariance matrix using the received third state variable matrix and third error covariance matrix.

Here, the fusion unit may generate the final position information about the joint of the user using the third state variable matrix and the third error covariance matrix when a cumulative error of the third state variable matrix and the third error covariance matrix is less than a preset value.

Also, in order to accomplish the above objectives, a method for recognizing a posture based on a distributed fusion filter, in which an apparatus for recognizing a posture based on a distributed fusion filter is used, according to an embodiment of the present invention includes generating first position information about a joint of a user by receiving measurement signals from multiple inertial sensors placed on a body of the user; generating second position information about the joint of the user using output information acquired in such a way that a vision sensor captures an image of the user; and fusing the first position information with the second position information and generating final position information about the joint of the user using the fused information.

Here, generating the first position information may be configured to generate the first position information about the joint of the user by connecting the measurement signals with body information of the user by a kinematic relationship.

Here, generating the final position information may be configured to estimate a first state variable matrix and a first error covariance matrix, which is an error covariance matrix of the first state variable matrix, using a first sub-filter based on the first position information, and to estimate a second state variable matrix and a second error covariance matrix, which is an error covariance matrix of the second state variable matrix, using a second sub-filter based on the second position information.

Here, each of the first state variable matrix and the second state variable matrix may be configured such that a first row contains first-axis position information, a second row contains second-axis position information, a third row contains first-axis speed information based on the first-axis position information, and a fourth row contains second-axis speed information based on the second-axis position information.

Here, a magnitude of measurement error covariance of the first sub-filter may be set equal to that of the second sub-filter.

Here, generating the final position information may be configured to add a first inverse matrix, which is an inverse matrix of the estimated first error covariance matrix, and a second inverse matrix, which is an inverse matrix of the estimated second error covariance matrix, and to calculate a third error covariance matrix by performing inverse-transformation of a third inverse matrix, which is a sum of the first inverse matrix and the second inverse matrix.

Here, generating the final position information may be configured to calculate a third state variable matrix by multiplying the third error covariance matrix by a third fusion matrix, which is a sum of a first fusion matrix and a second fusion matrix, the first fusion matrix being calculated by multiplying the estimated first state variable matrix by the first inverse matrix, and the second fusion matrix being calculated by multiplying the estimated second state variable matrix by the second inverse matrix.

Here, generating the final position information may be configured to feed the calculated third state variable matrix and the calculated third error covariance matrix back to the first sub-filter and the second sub-filter.

Here, the first sub-filter and the second sub-filter may estimate the first state variable matrix, the first error covariance matrix, the second state variable matrix, and the second error covariance matrix using the received third state variable matrix and third error covariance matrix.

Here, generating the final position information may be configured to generate the final position information about the joint of the user using the third state variable matrix and the third error covariance matrix when a cumulative error of the third state variable matrix and the third error covariance matrix is less than a preset value.

BRIEF DESCRIPTION OF THE DRAWINGS

The above and other objectives, features and advantages of the present invention will be more clearly understood from the following detailed description taken in conjunction with the accompanying drawings, in which.

DESCRIPTION OF THE PREFERRED EMBODIMENTS

Figure 1:
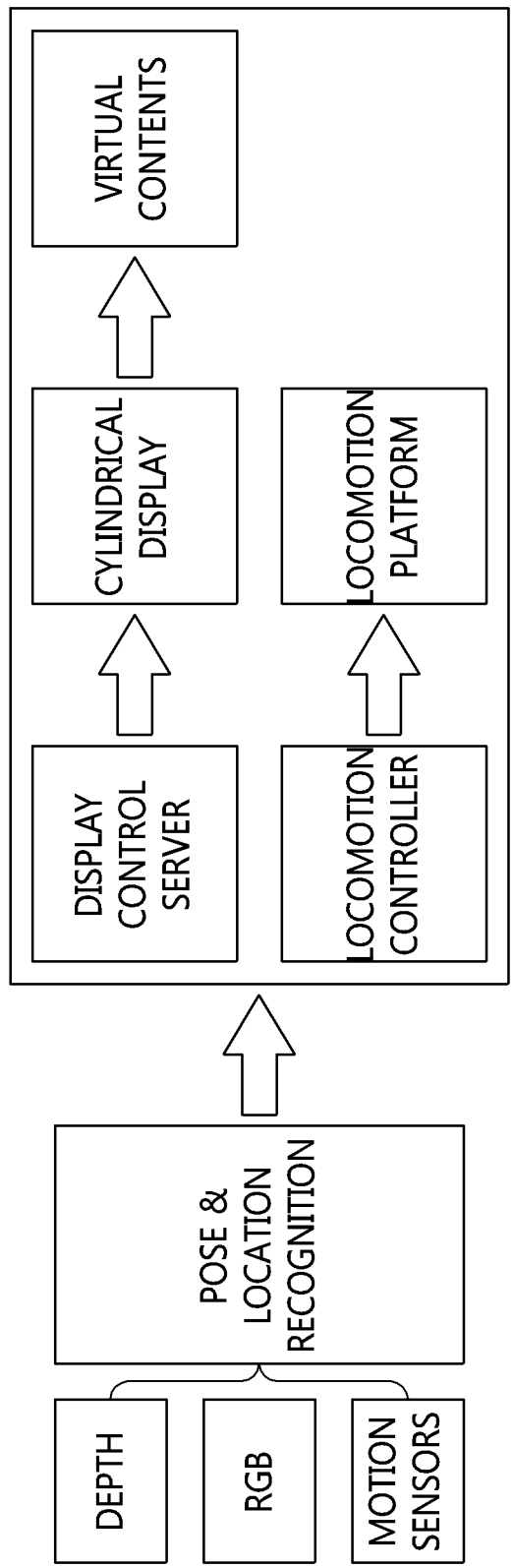
FIG. 1 is a diagram that shows a virtual reality simulator according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, a preferred embodiment according to the present invention will be described in detail with reference to the accompanying drawings.

FIG. 1 is a diagram that shows a virtual reality simulator according to an embodiment of the present invention.

Referring to FIG. 1, a virtual reality simulator according to an embodiment of the present invention may recognize a pose and a location using depth, RGB and motion sensors.

Here, based on the recognized posture information, the virtual reality simulator may provide posture information to a display control server and a locomotion controller.

The display control server shows user-desired content (a background image, an interaction object, or the like) by displaying it on a cylindrical display based on the recognized posture information. The locomotion controller may provide virtual content to a user by controlling a locomotion platform.

Figure 2:
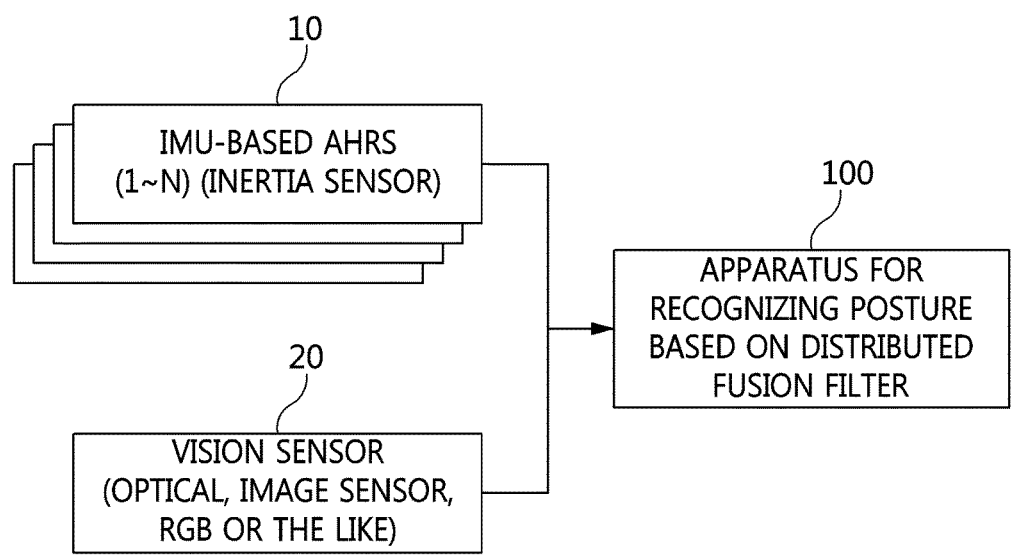
FIG. 2 is a block diagram that shows an inertial sensor, a vision sensor, and an apparatus for recognizing a posture based on a distributed fusion filter according to an embodiment of the present invention.
Figure 3:
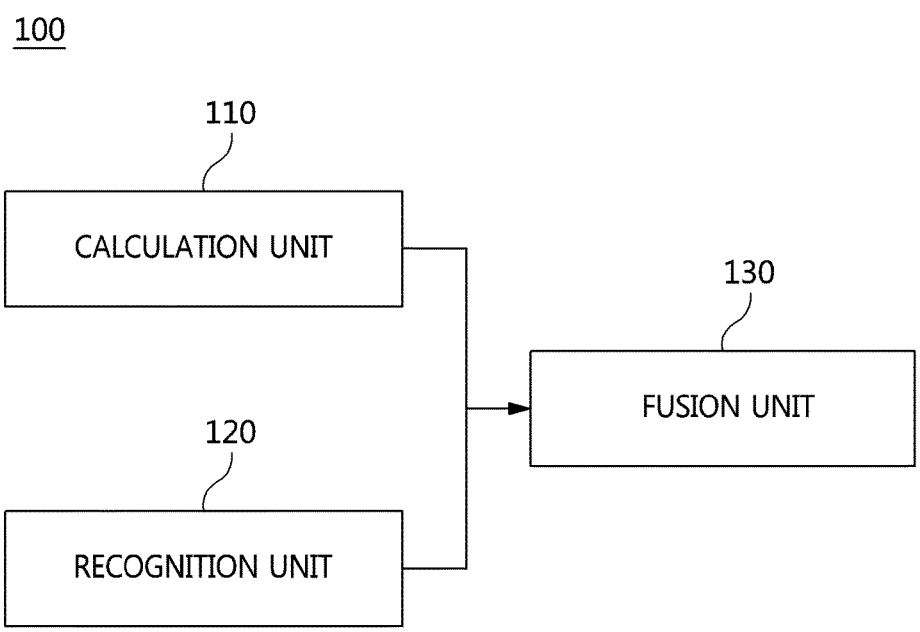
FIG. 3 is a block diagram that specifically shows an example of the apparatus for recognizing a posture based on a distributed fusion filter, illustrated in FIG. 2.
Figure 4:
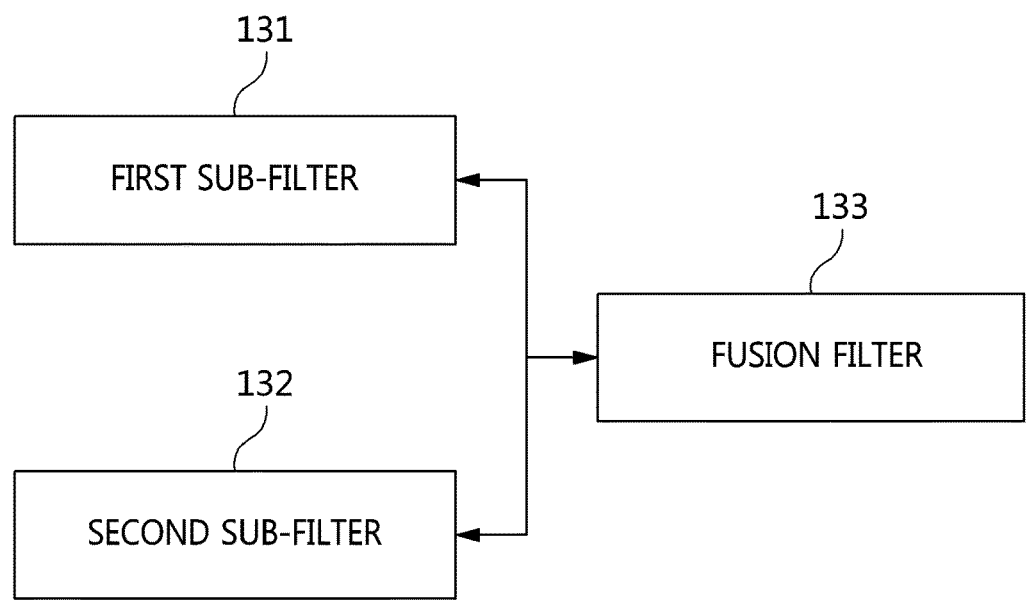
FIG. 4 is a block diagram that specifically shows an example of the fusion unit illustrated in FIG. 3.

FIG. 2 is a block diagram that shows an inertial sensor, a vision sensor, and an apparatus for recognizing a posture based on a distributed fusion filter according to an embodiment of the present invention. FIG. 3 is a block diagram that specifically shows an example of the apparatus for recognizing a posture based on a distributed fusion filter, illustrated in FIG. 2. FIG. 4 is a block diagram that specifically shows an example of the fusion unit illustrated in FIG. 3.

Referring to FIG. 2, an apparatus 100 for recognizing a posture based on a distributed fusion filter according to an embodiment of the present invention is configured to be connected with an inertial sensor 10 and a vision sensor 20.

The inertial sensor 10 may comprise multiple inertial sensors placed on the body of a user (or a subject).

Here, the inertial sensor 10 may be an Attitude Heading Reference System (AHRS) based on an Inertial Measurement Unit (IMU).

Here, values measured at respective joints, calculated through an IMU-based AHRS, have a characteristic in that a measurement error gradually increases due to the integration of an initial orientation error, a link length error, a posture calculation error, and the like.

In order to solve the above problem, the inertial sensor 10 according to an embodiment of the present invention may employ a method of an Inertial Navigation System (INS), in which a measurement is calculated by integrating the output of the inertial sensor, or a method in which a measurement value, calculated using the fusion of a gyroscope, an accelerometer, and a geomagnetic sensor, which is provided by the sensor itself, is combined with link information in order to acquire the measurement.

Generally, when the posture of a user is tracked using the inertial sensor 10, an error may accumulate over time. In order to compensate for this, the present invention proposes a filtering method in which information output from the vision sensor 20 is fused with a value measured by the inertial sensor 10.

The vision sensor 20 may be a device that is capable of outputting position information of the respective joints of a user using a camera.

For example, the vision sensor 20 may correspond to an optical camera, a depth image sensor, an RGB sensor, a Kinect device, or the like.

Here, information output from the vision sensor 20 may have different accuracy depending on the positions of the respective joints of a user. Particularly, information output from the vision sensor 20 may be characterized in that error increases as the position is closer to distal parts of a body.

Accordingly, the present invention may configure a distributed fusion filter using position information corresponding to Joint Center Waist (JNT_CW).

Here, JNT_CW may correspond to a lumbar joint, among the joints of a user.

Here, because a lumbar joint is close to the center of the body of a user, when JNT_CW information corresponding to the lumbar joint, among the output information provided by the vision sensor 20, is used, measurement error may decrease, thus minimizing the effect of the error.

The apparatus 100 for recognizing a posture based on a distributed fusion filter may generate the final position information by fusing measurement signals of the inertial sensor 10 with output information of the vision sensor 20, and may then recognize the posture of a user based on the final position information.

Referring to FIG. 3, an apparatus 100 for recognizing a posture based on a distributed fusion filter according to an embodiment of the present invention includes a calculation unit 110, a recognition unit 120, and a fusion unit 130.

The calculation unit 110 may generate first position information about joints of a user by receiving measurement signals from the multiple inertial sensors 10 placed on the body of the user.

Here, the calculation unit 110 may generate the first position information about the joints of the user by connecting the measurement signals with the body information of the user using kinematic relationships.

That is, the calculation unit 110 may compare the values, acquired in such a way that the inertial sensors 10 measure positions of the respective joints of the user, with the user's body information corresponding to the height of the user, coordinates of positions of the respective joints, length between joints, and the like, which are input to the calculation unit 110.

Here, the calculation unit 110 may generate the first position information about the joints of the user by mapping the measurement signals to the body information based on the result of the comparison.

Here, the calculation unit 110 may input the first position information to the first sub-filter 131 of the fusion unit 130.

The recognition unit 120 may generate second position information about the joints of the user using the output information of the vision sensor 20, which is acquired by capturing an image of the user.

Here, the recognition unit 120 may generate the second position information using the position information corresponding to Joint Center Waist (JNT_CW), among position information of the respective joints of the user, provided by the vision sensor 20.

Here, JNT_CW may correspond to a lumber joint, among the joints of the user.

Here, because a lumbar joint is close to the center of the body of the user, if the recognition unit 120 uses JNT_CW information corresponding to the lumbar joint, among the output information provided by the vision sensor 20, a measurement error may decrease, thus minimizing the effect of the error.

Referring to FIG. 4, the fusion unit 130 may include a first sub-filter 131, a second sub-filter 132, and a fusion filter 133.

The first sub-filter 131, the second sub-filter 132, and the fusion filter 133 may be configured using a discrete Kalman filter.

First, the fusion unit 130 may estimate a state variable matrix and an error covariance matrix.

The first sub-filter 131 may estimate a first state variable matrix and a first error covariance matrix based on the first position information provided by the calculation unit 110.

The second sub-filter 132 may estimate a second state variable matrix and a second error covariance matrix based on the second position information provided by the recognition unit 120.

A state variable matrix according to an embodiment of the present invention may be formed as Equation (1):

$$X = [P_{JNT\_CW}{}^I(x) P_{JNT\_CW}{}^I(y) V_{JNT\_CW}{}^I(x) V_{JNT\_CW}{}^I(y)]^T \quad (1)$$

where $P_{JNT\_CW}{}^I$ may correspond to x-axis and y-axis position information, and $V_{JNT\_CW}{}^I$ may correspond to speed information on x-axis and y-axis.

Here, the superscript, 'T' may correspond to the transposition of a matrix.

A system matrix and a measurement matrix based on the state variables may be formed as Equation (2) and Equation (3):

$$F = \begin{bmatrix} 1 & 0 & T & 0 \\ 0 & 1 & 0 & T \\ 0 & 0 & 1 & 0 \\ 0 & 0 & 0 & 1 \end{bmatrix} \quad (2)$$

$$H = \begin{bmatrix} 1 & 0 & 0 & 0 \\ 0 & 1 & 0 & 0 \end{bmatrix} \quad (3)$$

Accordingly, the initialized first state variable matrix and the initialized first error covariance matrix of the first sub-filter 131 may be defined as Equation (4) and Equation (5):

$$X_0^{IMU-} = [0\ 0\ 0\ 0]^T \quad (4)$$

where the superscript, 'T' may correspond to the transposition of a matrix.

$$P_0^{IMU} = \begin{bmatrix} (1m)^2 & 0 & 0 & 0 \\ 0 & (1m)^2 & 0 & 0 \\ 0 & 0 & (0.1m/s)^2 & 0 \\ 0 & 0 & 0 & (0.1m/s)^2 \end{bmatrix} \quad (5)$$

The initialized second state variable matrix and the initialized second error covariance matrix of the second sub-filter 132 may be defined as Equation (6) and Equation (7):

$$X^{Vision-} = [0\ 0\ 0\ 0]^T \quad (6)$$

where the superscript, 'T' may correspond to the transposition of a matrix.

$$P_0^{Vision} = \begin{bmatrix} (1m)^2 & 0 & 0 & 0 \\ 0 & (1m)^2 & 0 & 0 \\ 0 & 0 & (0.1m/s)^2 & 0 \\ 0 & 0 & 0 & (0.1m/s)^2 \end{bmatrix} \quad (7)$$

where the superscript, '-' represents time propagation, and may be written at the time of initialization before a measurement value is updated.

Also, the first process noise covariance matrix and the first measurement noise covariance matrix of the first sub-filter 131 may be formed as Equation (8) and Equation (9):

$$Q^{IMU} = \begin{bmatrix} T^3/3 & 0 & T^2/2 & 0 \\ 0 & T^3/3 & 0 & T^2/2 \\ T^2/2 & 0 & T & 0 \\ 0 & T^2/2 & 0 & T \end{bmatrix} \quad (8)$$

$$R^{IMU} = \begin{bmatrix} (0.1m)^2 & 0 \\ 0 & (0.1m)^2 \end{bmatrix} \quad (9)$$

Here, the second process noise covariance matrix and the second measurement noise covariance matrix of the second sub-filter 132 may be formed as Equation (10) and Equation (11):

$$Q^{Vision} = \begin{bmatrix} T^3/3 & 0 & T^2/3 & 0 \\ 0 & T^3/3 & 0 & T^2/3 \\ T^2/3 & 0 & T & 0 \\ 0 & T^2/3 & 0 & T \end{bmatrix} \quad (10)$$

$$R^{Vision} = \begin{bmatrix} (0.1m)^2 & 0 \\ 0 & (0.1m)^2 \end{bmatrix} \quad (11)$$

Here, the variable 'T' in Equation (2), Equation (8), and Equation (10) may correspond to a measurement update interval. According to an embodiment of the present invention, the measurement update interval may be set to 0.1 seconds.

The position value estimated based on the inertial sensor 10 (IMU) may have characteristics in that an error increases over time, and the position value may include errors such as a link size error and the like. Meanwhile, the position value provided by the vision sensor 20 (Vision) does not include an error that increases over time but includes an error that jumps depending on a position. Accordingly, it is difficult to give a high level of confidence only to either the first sub-filter 131 or the second sub-filter 132. Therefore, according to an embodiment of the present invention, the magnitude of the measurement error covariance of the first sub-filter 131 may be set equal to that of the second sub-filter 132.

In order to update the measurement in the first sub-filter 131 and the second sub-filter 132, first, Kalman gain may be calculated.

The first sub-filter 131 may calculate the Kalman gain based on Equation (12):

$$K_k^{IMU} = P_k^{IMU-} H^T (H P_k^{IMU-} H^T + R^{IMU})^{-1} \quad (12)$$

where the superscript, 'T' may correspond to the transposition of a matrix.

The second sub-filter 132 may calculate the Kalman gain based on Equation (13):

$$K_k^{Vision} = P_k^{Vision-} H^T (H P_k^{Vision-} H^T + R^{Vision})^{-1} \quad (13)$$

where the superscript, 'T' may correspond to the transposition of a matrix.

Also, the first sub-filter 131 may update the measurement of the first state variable matrix and the first error covariance matrix, as shown in Equation (14):

$$\hat{X}_k^{IMU} = \hat{X}_k^{IMU-} + Kg_k^{IMU}(z_k^{IMU} - H\hat{X}_k^{IMU-}) \quad (14)$$

$$P_k^{IMU} = (I_{4 \times 4} - Kg_k^{IMU} H) P_k^{IMU-}$$

$$z_k^{IMU} = \begin{bmatrix} P_{JNT\_CW(IMU),k}^I(x) \\ P_{JNT\_CW(IMU),k}^I(y) \end{bmatrix}$$

Also, the second sub-filter 132 may update the measurement of the second state variable matrix and the second error covariance matrix, as shown in Equation (15):

$$\hat{X}_k^{Vision} = \hat{X}_k^{Vision-} + Kg_k^{Vision}(z_k^{Vision} - \hat{X}_k^{Vision-})$$

$$P_k^{Vision} = (I_{4 \times 4} - Kg_k^{Vision} H) P_k^{Vision-}$$

$$z_k^{Vision} = \begin{bmatrix} P^I_{JNT\_CW(Vision),k}(x) \\ P^I_{JNT\_CW(Vision),k}(y) \end{bmatrix}$$

(15)

Here, $I_{4 \times 4}$, in Equation (14) and Equation (15) may correspond to a 4×4 unit matrix.

Also, the first sub-filter 131 may calculate time propagation of the first state variable matrix and the first error covariance matrix, as shown in Equation (16):

$$\hat{X}_{k+1}^{IMU-} = F\hat{X}_k^{IMU}$$

$$P_{k+1}^{IMU-} = FP_k^{IMU} F^T + Q \quad (16)$$

where the superscript, 'T' may correspond to the transposition of a matrix.

Also, the second sub-filter 132 may calculate time propagation of the second state variable matrix and the second error covariance matrix, as shown in Equation (17):

$$\hat{X}_{k+1}^{Vision-} = F\hat{X}_k^{Vision}$$

$$P_{k+1}^{Vision-} = FP_k^{Vision} F^T + Q \quad (17)$$

where the superscript, 'T' may correspond to the transposition of a matrix.

After the first sub-filter 131 and the second sub-filter 132 respectively update the measurements, the fusion filter 133 may fuse the first error covariance matrix with the second error covariance matrix, and may fuse the first state variable matrix with the second state variable matrix.

The fusion filter 133 may generate the third error covariance matrix by fusing the first error covariance matrix with the second error covariance matrix, and may generate the third state variable matrix, into which the first state variable matrix and the second state variable matrix are fused using the third error covariance matrix, as shown in Equation (18):

$$P_k^F = (I_k^{IMU} + I_k^{Vision})^{-1}$$

$$\hat{X}_k^F = P_k^F (I_k^{IMU} \hat{X}_k^{IMU} + I_k^{Vision} \hat{X}_k^{Vision}) \quad (18)$$

where $I_k^{IMU} = (P_k^{IMU})^{-1}$ may correspond to the information matrix of the first sub-filter 131, and $I_k^{Vision} = (P_k^{Vision})^{-1}$ may correspond to the information matrix of the second sub-filter 132.

That is, the fusion filter 133 adds the first inverse matrix, which is the inverse matrix of the first error covariance matrix, and the second inverse matrix, which is the inverse matrix of the second error covariance matrix, and may then calculate the third error covariance matrix by performing inverse-transformation of the third inverse matrix, which is the sum of the first inverse matrix and the second inverse matrix, as shown in Equation (18).

Here, as shown in Equation (18), the fusion filter 133 may calculate the third state variable matrix by multiplying the third error covariance matrix by the third fusion matrix, which is the sum of the first fusion matrix and the second fusion matrix, wherein the first fusion matrix is calculated by multiplying the first state variable matrix by the first inverse matrix, and the second fusion matrix is calculated by multiplying the second state variable matrix by the second inverse matrix.

Here the fusion filter 133 may feed the calculated third state variable matrix and third error covariance matrix back into the first sub-filter 131 and the second sub-filter 132.

Here, the first sub-filter 131 and the second sub-filter 132 may estimate the first state variable matrix, the first error covariance matrix, the second state variable matrix, and the second error covariance matrix using the received third state variable matrix and third error covariance matrix.

Also, when the cumulative error of the third state variable matrix and the third error covariance matrix is less than a preset value, the fusion filter 133 may generate the final position information about the joints of the user using the third state variable matrix and the third error covariance matrix.

Figure 5:
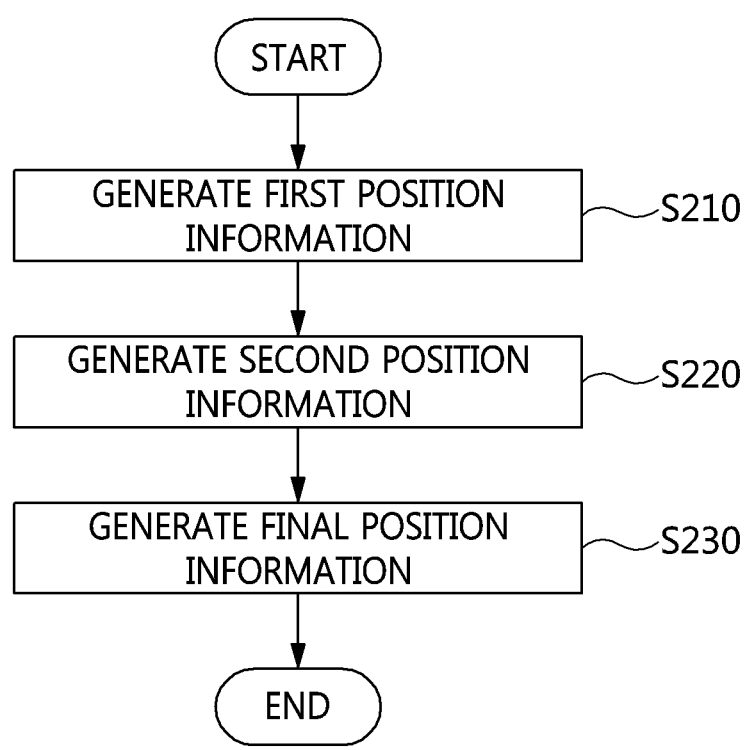
FIG. 5 is a flowchart that shows a method for recognizing a posture based on a distributed fusion filter according to an embodiment of the present invention.

FIG. 5 is a flowchart that shows a method for recognizing a posture based on a distributed fusion filter according to an embodiment of the present invention.

Referring to FIG. 5, in the method for recognizing a posture based on a distributed fusion filter according to an embodiment of the present invention, first position information may be generated at step S210.

That is, at step S210, first, measurement signals may be received at step S211.

Here, measurement signals may be received from multiple inertial sensors 10 placed on the body of a user at step S211.

Also, at step S210, a connection is made by kinematic relationships at step S212.

That is, the measurement signals may be connected with the body information of the user using kinematic relationships at step S212.

Here, at step S212, the values, acquired in such a way that the inertial sensors 10 measure positions of the respective joints of the user, may be compared with the user's body information corresponding to the height of the user, coordinates of positions of the respective joints, length between joints, and the like, which are input to the calculation unit 110.

Here, the measurement signals are mapped to the body information based on the result of the comparison, whereby they may be connected with each other based on kinematic relationships at step S212.

Also, at step S210, first position information may be generated at step S213.

That is, the first position information about the joints of the user may be generated at step S213 based on the measurement signals and the body information, which are connected using kinematic relationships.

Also, in the method for recognizing a posture based on a distributed fusion filter according to an embodiment of the present invention, second position information may be generated at step S220.

That is, at step S220, second position information about the joints of the user may be generated using the output information of the vision sensor 20, which is acquired by capturing an image of the user.

Here, at step S220, the second position information may be generated using the position information corresponding to Joint Center Waist (JNT_CW), among position information of the respective joints of the user, provided by the vision sensor 20.

Here, JNT_CW may correspond to a lumber joint, among the joints of the user.

Here, because a lumbar joint is close to the center of the body of the user, if JNT_CW information corresponding to the lumbar joint, among the output information provided by the vision sensor 20, is used at step S220, a measurement error may decrease, thus minimizing the effect of the error.

Also, in the method for recognizing a posture based on a distributed fusion filter according to an embodiment of the present invention, the final position information may be generated at step S230.

That is, at step S230, first, a state variable matrix and an error covariance matrix may be estimated at step S231.

Here, the first sub-filter 131 may estimate a first state variable matrix and a first error covariance matrix based on the first position information at step S231.

Here, the second sub-filter 132 may estimate a second state variable matrix and a second error covariance matrix based on the second position information at step S231.

The state variable matrix according to an embodiment of the present invention may be formed as Equation (1).

A system matrix and a measurement matrix based on state variables may be formed as Equation (2) and Equation (3).

Accordingly, the initialized first state variable matrix and the initialized first error covariance matrix of the first sub-filter 131 may be defined as Equation (4) and Equation (5).

The initialized second state variable matrix and the initialized second error covariance matrix of the second sub-filter 132 may be defined as Equation (6) and Equation (7).

Also, the first process noise covariance matrix and the first measurement noise covariance matrix of the first sub-filter 131 may be formed as Equation (8) and Equation (9).

Here, the second process noise covariance matrix and the second measurement noise covariance matrix of the second sub-filter 132 may be formed as Equation (10) and Equation (11).

Here, the variable 'T' in Equation (2), Equation (8), and Equation (10) may correspond to a measurement update interval. According to an embodiment of the present invention, the measurement update interval may be set to 0.1 seconds.

The position value estimated based on the inertial sensor 10 (IMU) may be characterized in that an error increases over time, and the position value may include errors such as a link size error and the like. Meanwhile, the position value provided by the vision sensor 20 (Vision) does not include an error that increases over time but includes an error that jumps depending on a position. Accordingly, it is difficult to give a high level of confidence only to either the first sub-filter 131 or the second sub-filter 132. Therefore, according to an embodiment of the present invention, the magnitude of the measurement error covariance of the first sub-filter 131 may be set equal to that of the second sub-filter 132.

Also, at step S230, a Kalman gain may be calculated at step S232.

That is, the first sub-filter 131 may calculate a Kalman gain based on Equation (12) at step S232.

Here, the second sub-filter 132 may calculate a Kalman gain based on Equation (13) at step S232.

Here, at step S232, the first sub-filter 131 may update the measurement of the first state variable matrix and the first error covariance matrix, as shown in Equation (14).

Here, at step S232, the second sub-filter 132 may update the measurement of the second state variable matrix and the second error covariance matrix, as shown in Equation (15).

Also, at step S230, time propagation may be calculated at step S233.

That is, at step S233, the first sub-filter 131 may calculate time propagation of the first state variable matrix and the first error covariance matrix, as shown in Equation (16).

Here, at step S233, the second sub-filter 132 may calculate time propagation of the second state variable matrix and the second error covariance matrix, as shown in Equation (17).

Also, at step S230, the state variable matrices and the error covariance matrices may be fused at step S234.

That is, at step S234, after the first sub-filter 131 and the second sub-filter 132 respectively update measurements, the fusion filter 133 may fuse the first error covariance matrix with the second error covariance matrix, and may fuse the first state variable matrix with the second state variable matrix.

Here, at step S234, the fusion filter 133 may generate the third error covariance matrix by fusing the first error covariance matrix with the second error covariance matrix, and may generate the third state variable matrix into which the first state variable matrix and the second state variable matrix are fused using the third error covariance matrix, as shown in Equation (18).

That is, at step S234, the fusion filter 133 adds the first inverse matrix, which is the inverse matrix of the first error covariance matrix, and the second inverse matrix, which is the inverse matrix of the second error covariance matrix, and may then calculate the third error covariance matrix by performing inverse-transformation of the third inverse matrix, which is the sum of the first inverse matrix and the second inverse matrix, as shown in Equation (18).

Here, as shown in Equation (18), the fusion filter 133 may calculate the third state variable matrix at step S234 by multiplying the third error covariance matrix by the third fusion matrix, which is the sum of the first fusion matrix and the second fusion matrix, wherein the first fusion matrix is calculated by multiplying the first state variable matrix by the first inverse matrix, and the second fusion matrix is calculated by multiplying the second state variable matrix by the second inverse matrix.

Also, at step S230, the calculated third state variable matrix and the third error covariance matrix are accumulated and compared with the previously calculated value, whereby a cumulative error may be checked at step S235.

That is, when it is determined at step S235 that the cumulative error is equal to or greater than a preset value, the fusion filter 133 may feed the calculated third state variable matrix and third error covariance matrix back into the first sub-filter 131 and the second sub-filter 132 at step S236.

Here, the first sub-filter 131 and the second sub-filter 132 may perform step S231, at which the first state variable matrix, the first error covariance matrix, the second state variable matrix, and the second error covariance matrix are estimated using the received third state variable matrix and third error covariance matrix.

Also, when it is determined at step S235 that the cumulative error of the third state variable matrix and the third error covariance matrix is less than the preset value, the fusion filter 133 may generate the final position information about the joints of the user using the third state variable matrix and the third error covariance matrix at step S237.

Figure 6:
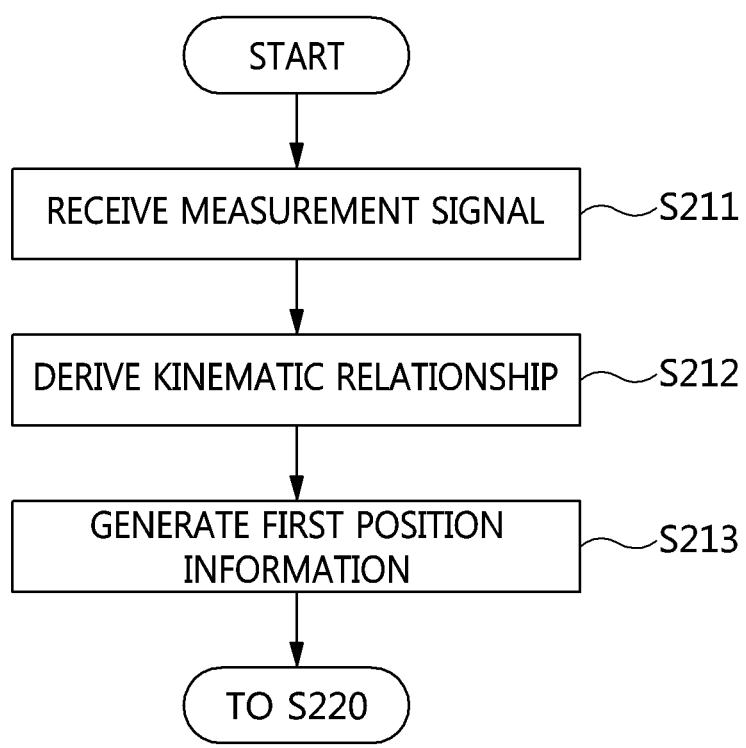
FIG. 6 is a flowchart that specifically shows an example of the step of generating first position information, illustrated in FIG. 5.

FIG. 6 is a flowchart that specifically shows an example of the step of generating the first position information, illustrated in FIG. 5.

Referring to FIG. 6, measurement signals may be received from multiple inertial sensors 10 placed on the body of a user at step S211.

Also, at step S210, a connection is made using kinematic relationships at step S212.

That is, the measurement signals may be connected with the body information of the user based on kinematic relationships at step S212.

Here, at step S212, the values, acquired in such a way that the inertial sensors 10 measure positions of the respective joints of the user, may be compared with the user's body information corresponding to the height of the user, coordinates of positions of the respective joints, length between joints, and the like, which are input to the calculation unit 110.

Here, the measurement signals are mapped to the body information based on the result of the comparison, whereby they may be connected with each other by kinematic relationships at step S212.

Also, at step S210, first position information may be generated at step S213.

That is, the first position information about the joints of the user may be generated at step S213 based on the measurement signals and the body information, which are connected by kinematic relationships.

Figure 7:
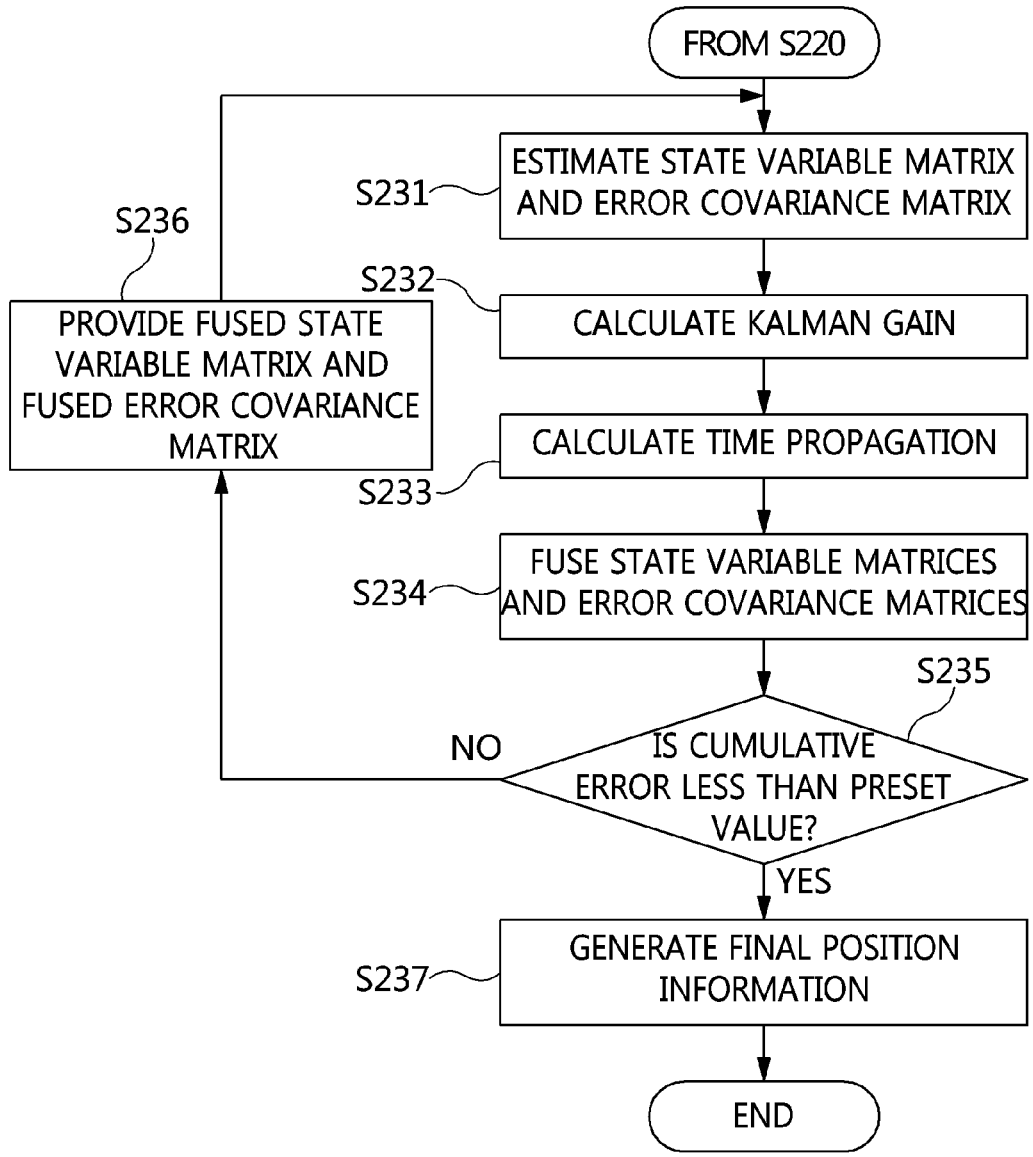
FIG. 7 is a flowchart that specifically shows an example of the step of generating the final position information, illustrated in FIG. 5.

FIG. 7 is a flowchart that specifically shows an example of the step of generating the final position information, illustrated in FIG. 5.

Referring to FIG. 7, at step S230, first, a state variable matrix and an error covariance matrix may be estimated at step S231.

Here, the first sub-filter 131 may estimate a first state variable matrix and a first error covariance matrix based on the first position information at step S231.

Here, the second sub-filter 132 may estimate a second state variable matrix and a second error covariance matrix based on the second position information at step S231.

The state variable matrix according to an embodiment of the present invention may be formed as Equation (1).

A system matrix and a measurement matrix based on state variables may be formed as Equation (2) and Equation (3).

Accordingly, the initialized first state variable matrix and the initialized first error covariance matrix of the first sub-filter 131 may be defined as Equation (4) and Equation (5).

The initialized second state variable matrix and the initialized second error covariance matrix of the second sub-filter 132 may be defined as Equation (6) and Equation (7).

Also, the first process noise covariance matrix and the first measurement noise covariance matrix of the first sub-filter 131 may be formed as Equation (8) and Equation (9).

Here, the second process noise covariance matrix and the second measurement noise covariance matrix of the second sub-filter 132 may be formed as Equation (10) and Equation (11).

Here, the variable 'T' in Equation (2), Equation (8), and Equation (10) may correspond to a measurement update interval. According to an embodiment of the present invention, the measurement update interval may be set to 0.1 seconds.

The position value estimated based on the inertial sensor 10 (IMU) may have characteristics in that an error increases over time, and the position value may include errors, such as a link size error and the like. Meanwhile, the position value provided by the vision sensor 20 (Vision) does not include an error that increases over time but includes an error that jumps depending on a position. Accordingly, it is difficult to give a high level of confidence only to either the first sub-filter 131 or the second sub-filter 132. Therefore, according to an embodiment of the present invention, the magnitude of the measurement error covariance of the first sub-filter 131 may be set equal to that of the second sub-filter 132.

Also, at step S230, a Kalman gain may be calculated at step S232.

That is, the first sub-filter 131 may calculate a Kalman gain based on Equation (12) at step S232.

Here, the second sub-filter 132 may calculate a Kalman gain based on Equation (13) at step S232.

Here, at step S232, the first sub-filter 131 may update the measurement of the first state variable matrix and the first error covariance matrix, as shown in Equation (14).

Here, at step S232, the second sub-filter 132 may update the measurement of the second state variable matrix and the second error covariance matrix, as shown in Equation (15).

Also, at step S230, time propagation may be calculated at step S233.

That is, at step S233, the first sub-filter 131 may calculate time propagation of the first state variable matrix and the first error covariance matrix, as shown in Equation (16).

Here, at step S233, the second sub-filter 132 may calculate time propagation of the second state variable matrix and the second error covariance matrix, as shown in Equation (17).

Also, at step S230, the state variable matrices and the error covariance matrices may be fused at step S234.

That is, at step S234, after the first sub-filter 131 and the second sub-filter 132 respectively update measurements, the fusion filter 133 may fuse the first error covariance matrix with the second error covariance matrix, and may fuse the first state variable matrix with the second state variable matrix.

Here, at step S234, the fusion filter 133 may generate the third error covariance matrix by fusing the first error covariance matrix with the second error covariance matrix, and may generate the third state variable matrix into which the first state variable matrix and the second state variable matrix are fused using the third error covariance matrix, as shown in Equation (18).

That is, at step S234, the fusion filter 133 adds the first inverse matrix, which is the inverse matrix of the first error covariance matrix, and the second inverse matrix, which is the inverse matrix of the second error covariance matrix, and may then calculate the third error covariance matrix by performing inverse-transformation of the third inverse matrix, which is the sum of the first inverse matrix and the second inverse matrix, as shown in Equation (18).

Here, as shown in Equation (18), the fusion filter 133 may calculate the third state variable matrix at step S234 by multiplying the third error covariance matrix by the third fusion matrix, which is the sum of the first fusion matrix and the second fusion matrix, wherein the first fusion matrix is calculated by multiplying the first state variable matrix by the first inverse matrix and the second fusion matrix is calculated by multiplying the second state variable matrix by the second inverse matrix.

Also, at step S230, the calculated third state variable matrix and the third error covariance matrix are accumulated and compared with the previously calculated value, whereby a cumulative error may be checked at step S235.

That is, when it is determined at step S235 that the cumulative error is equal to or greater than a preset value, the fusion filter 133 may feed the calculated third state variable matrix and third error covariance matrix back into the first sub-filter 131 and the second sub-filter 132 at step S236.

Here, the first sub-filter 131 and the second sub-filter 132 may perform step S231, at which the first state variable matrix, the first error covariance matrix, the second state variable matrix, and the second error covariance matrix are estimated using the received third state variable matrix and third error covariance matrix.

Also, when it is determined at step S235 that the cumulative error of the third state variable matrix and the third error covariance matrix is less than the preset value, the fusion filter 133 may generate the final position information about the joints of the user using the third state variable matrix and the third error covariance matrix at step S237.

Figure 8:
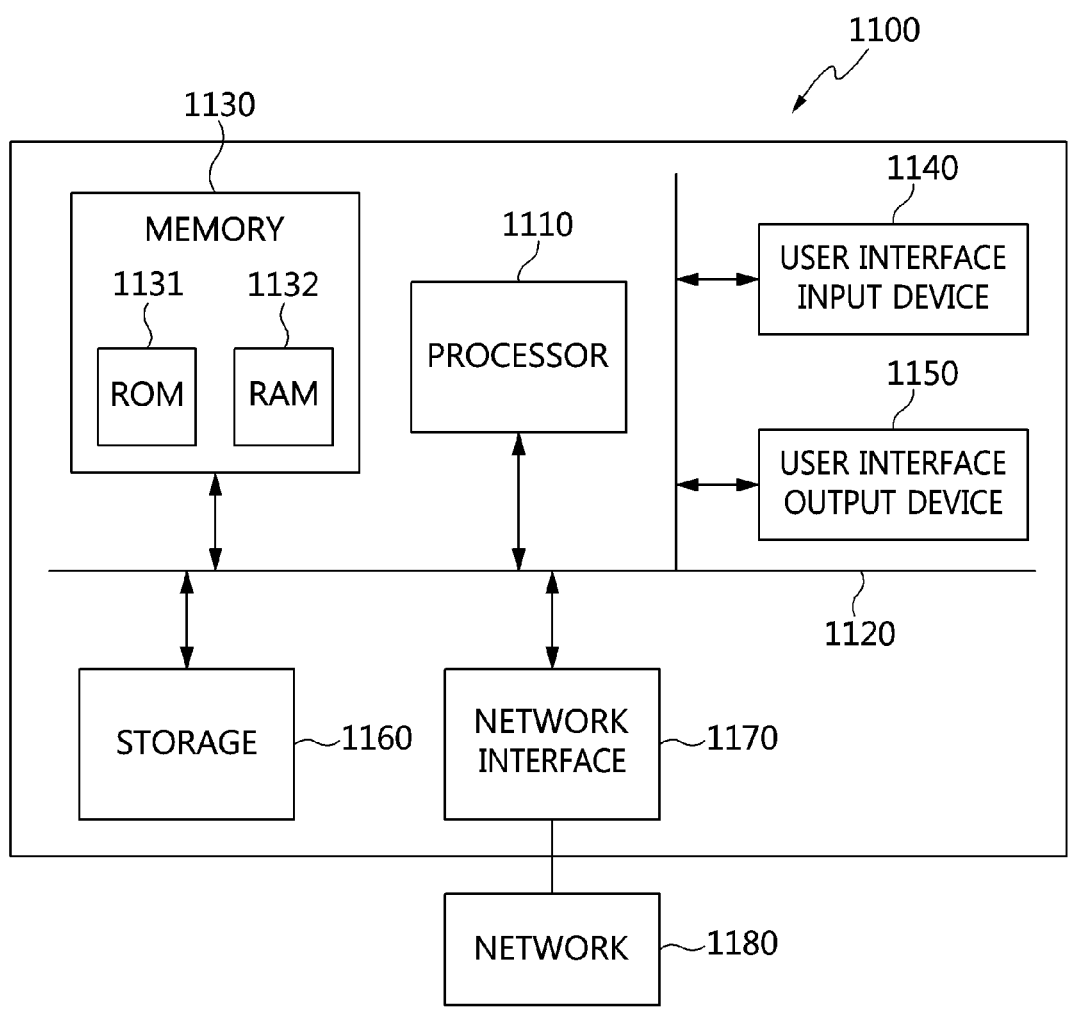
FIG. 8 is a block diagram that shows a computer system according to an embodiment of the present invention.

FIG. 8 is a block diagram that shows a computer system according to an embodiment of the present invention.

Referring to FIG. 8, an embodiment of the present invention may be implemented in a computer system 1100 such as a computer-readable recording medium. As illustrated in FIG. 8, the computer system 1100 may include one or more processors 1110, memory 1130, a user interface input device 1140, a user interface output device 1150, and storage 1160, which communicate with each other via a bus 1120. Also, the computer system 1100 may further include a network interface 1170 connected with a network 1180. The processor 1110 may be a central processing unit or a semiconductor device for executing processing instructions stored in the memory 1130 or the storage 1160. The memory 1130 and the storage 1160 may be different forms of volatile or nonvolatile storage media. For example, the memory may include ROM 1131 or RAM 1132.

The present invention may use two or more types of sensors together, thus increasing accuracy of estimation of user's postures, realizing fast responsiveness, etc., which are required for applications.

Also, the present invention may perform accurate and reliable recognition of postures using the advantages of existing posture recognition technologies and by supplementing the disadvantages thereof.

Also, the present invention may maximize the realism of virtual reality.

Also, the present invention may be applied to various applications, such as military tactical training, rehabilitation training, treatments, sports training, games, entertainment, and the like.

As described above, the apparatus and method for recognizing a posture based on a distributed fusion filter according to the present invention are not limitedly applied to the configurations and operations of the above-described embodiments, but all or some of the embodiments may be selectively combined and configured, so that the embodiments may be modified in various ways.

What is claimed is:

1. An apparatus for recognizing a posture based on a distributed fusion filter, comprising:
a calculation unit of a computer generating first position information about a joint of a user by receiving measurement signals from multiple inertial sensors placed on a body of the user;
a recognition unit of the computer generating second position information about the joint of the user using output information acquired in such a way that a vision sensor captures an image of the user; and
a fusion unit of the computer fusing the first position information with the second position information and generating final position information about the joint of the user using the fused information, the fusion unit of the computer estimates a first and second state variable matrix comprising axis speed information based on axis position information.

2. The apparatus of claim 1, wherein the calculation unit of the computer generates the first position information about the joint of the user by connecting the measurement signals with body information of the user by a kinematic relationship.

3. The apparatus of claim 2, wherein the fusion unit of the computer is configured to:
estimate a first state variable matrix and a first error covariance matrix, which is an error covariance matrix of the first state variable matrix, using a first sub-filter based on the first position information; and
estimate a second state variable matrix and a second error covariance matrix, which is an error covariance matrix of the second state variable matrix, using a second sub-filter based on the second position information.

4. The apparatus of claim 3, wherein each of the first state variable matrix and the second state variable matrix is configured such that:
a first row contains first-axis position information;
a second row contains second-axis position information;
a third row contains first-axis speed information based on the first-axis position information; and
a fourth row contains second-axis speed information based on the second-axis position information.

5. The apparatus of claim 4, wherein a magnitude of measurement error covariance of the first sub-filter is set equal to that of the second sub-filter.

6. The apparatus of claim 5, wherein the fusion unit of the computer adds a first inverse matrix, which is an inverse matrix of the estimated first error covariance matrix, and a second inverse matrix, which is an inverse matrix of the estimated second error covariance matrix, and calculates a third error covariance matrix by performing inverse-transformation of a third inverse matrix, which is a sum of the first inverse matrix and the second inverse matrix.

7. The apparatus of claim 6, wherein the fusion unit of the computer calculates a third state variable matrix by multiplying the third error covariance matrix by a third fusion matrix, which is a sum of a first fusion matrix and a second fusion matrix, the first fusion matrix being calculated by multiplying the estimated first state variable matrix by the first inverse matrix, and the second fusion matrix being calculated by multiplying the estimated second state variable matrix by the second inverse matrix.

8. The apparatus of claim 7, wherein the fusion unit of the computer feeds the calculated third state variable matrix and the calculated third error covariance matrix back to the first sub-filter and the second sub-filter.

9. The apparatus of claim 8, wherein the first sub-filter and the second sub-filter estimate the first state variable matrix, the first error covariance matrix, the second state variable matrix, and the second error covariance matrix using the received third state variable matrix and third error covariance matrix.

10. The apparatus of claim 9, wherein the fusion unit of the computer, generates the final position information about the joint of the user using the third state variable matrix and the third error covariance matrix when a cumulative error of the third state variable matrix and the third error covariance matrix is less than a preset value.

11. A method for recognizing a posture based on a distributed fusion filter, in which an apparatus for recognizing a posture based on a distributed fusion filter is used, comprising:
generating first position information about a joint of a user by receiving measurement signals from multiple inertial sensors placed on a body of the user;

generating second position information about the joint of the user using output information acquired in such a way that a vision sensor captures an image of the user; and fusing the first position information with the second position information and generating final position information about the joint of the user using the fused information, and estimating a first and second state variable matrix comprising axis speed information based on axis position information.

12. The method of claim 11, wherein generating the first position information is configured to generate the first position information about the joint of the user by connecting the measurement signals with body information of the user by a kinematic relationship.

13. The method of claim 12, wherein generating the final position information is configured to:

estimate a first state variable matrix and a first error covariance matrix, which is an error covariance matrix of the first state variable matrix, using a first sub-filter based on the first position information; and estimate a second state variable matrix and a second error covariance matrix, which is an error covariance matrix of the second state variable matrix, using a second sub-filter based on the second position information.

14. The method of claim 13, wherein each of the first state variable matrix and the second state variable matrix is configured such that:

a first row contains first-axis position information;
a second row contains second-axis position information;
a third row contains first-axis speed information based on the first-axis position information; and
a fourth row contains second-axis speed information based on the second-axis position information.

15. The method of claim 14, wherein a magnitude of measurement error covariance of the first sub-filter is set equal to that of the second sub-filter.

16. The method of claim 15, wherein generating the final position information is configured to add a first inverse matrix, which is an inverse matrix of the estimated first error covariance matrix, and a second inverse matrix, which is an inverse matrix of the estimated second error covariance matrix, and to calculate a third error covariance matrix by performing inverse-transformation of a third inverse matrix, which is a sum of the first inverse matrix and the second inverse matrix.

17. The method of claim 16, wherein generating the final position information is configured to calculate a third state variable matrix by multiplying the third error covariance matrix by a third fusion matrix, which is a sum of a first fusion matrix and a second fusion matrix, the first fusion matrix being calculated by multiplying the estimated first state variable matrix by the first inverse matrix, and the second fusion matrix being calculated by multiplying the estimated second state variable matrix by the second inverse matrix.

18. The method of claim 17, wherein generating the final position information is configured to feed the calculated third state variable matrix and the calculated third error covariance matrix back to the first sub-filter and the second sub-filter.

19. The method of claim 18, wherein the first sub-filter and the second sub-filter estimate the first state variable matrix, the first error covariance matrix, the second state variable matrix, and the second error covariance matrix using the received third state variable matrix and third error covariance matrix.

20. The method of claim 19, wherein generating the final position information is configured to generate the final position information about the joint of the user using the third state variable matrix and the third error covariance matrix when a cumulative error of the third state variable matrix and the third error covariance matrix is less than a preset value.

* * * * *